May 27, 1924.

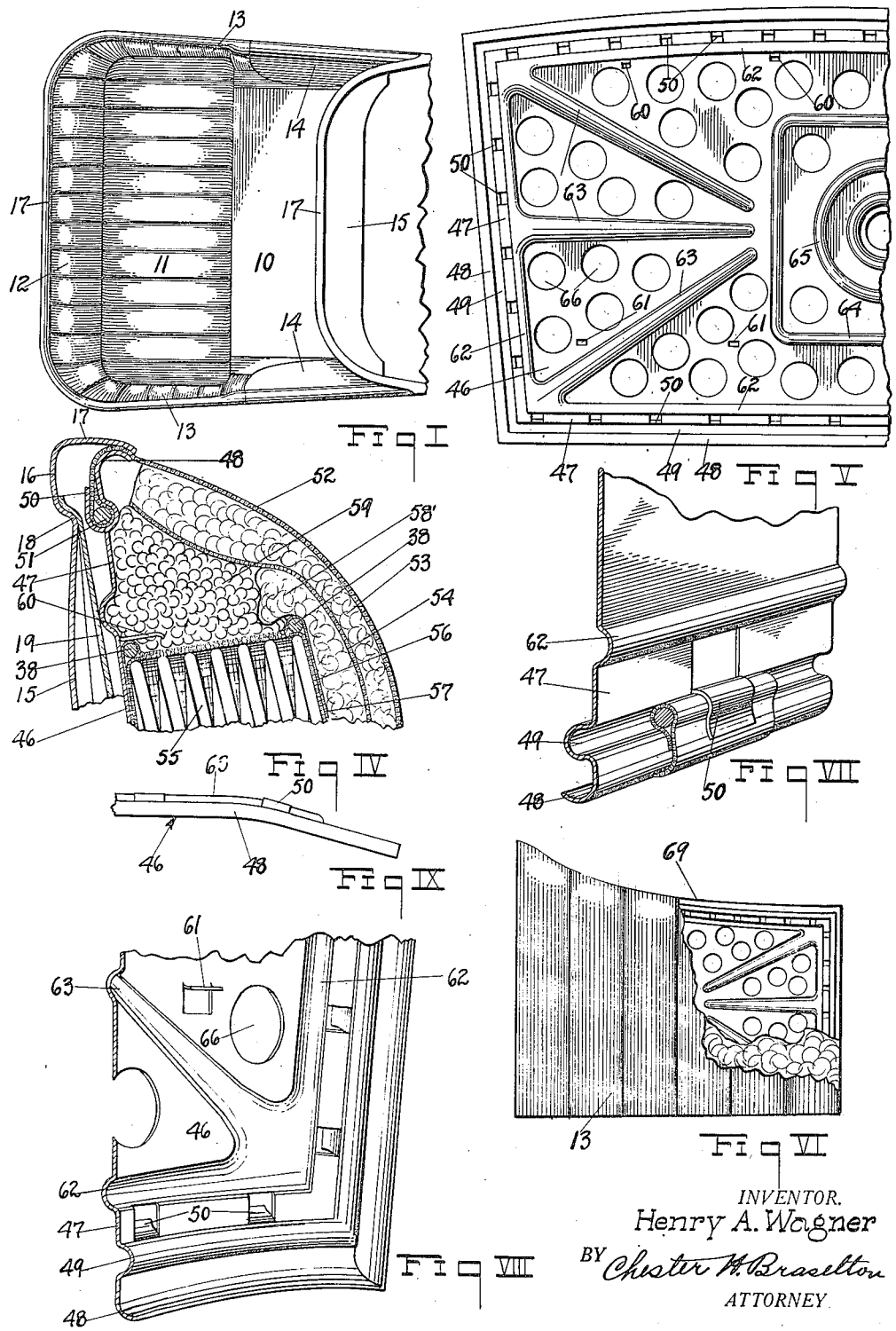

H. A. WAGNER

SEAT STRUCTURE

Filed Jan. 2, 1920

1,495,281

3 Sheets-Sheet 2

Fig III

Fig II

INVENTOR.
Henry A. Wagner
BY Chester H. Braselton
ATTORNEY

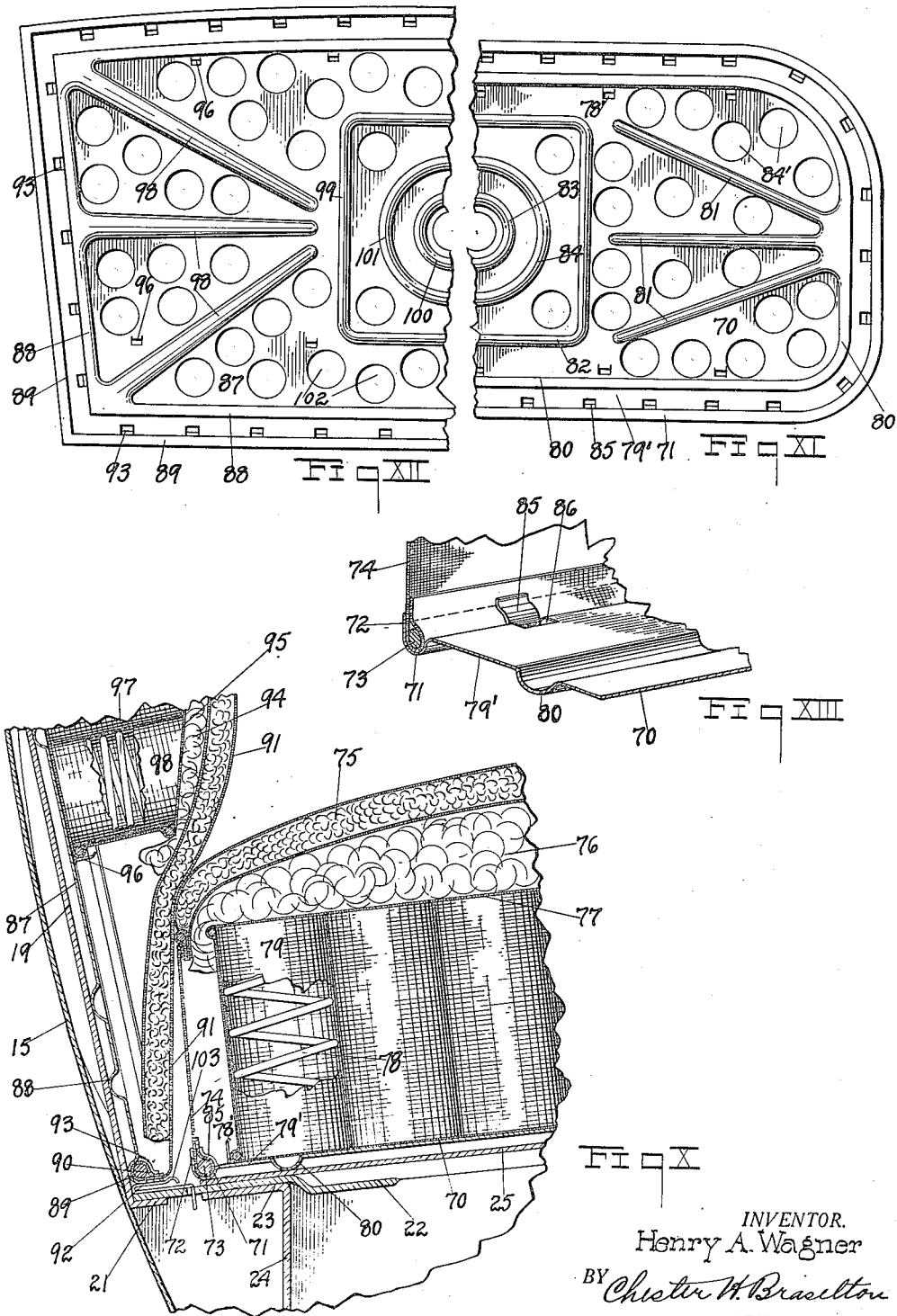

Patented May 27, 1924.

1,495,281

UNITED STATES PATENT OFFICE.

HENRY A. WAGNER, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SEAT STRUCTURE.

Application filed January 2, 1920. Serial No. 348,917.

*To all whom it may concern:*

Be it known that I, HENRY A. WAGNER, a citizen of the United States, residing at Toledo, in the county of Lucas, State of Ohio, have invented certain new and useful Improvements in Seat Structures, of which I declare the following to be a full, clear, and exact description.

My invention relates to improvements in seat structures, and is particularly directed to seat structures for vehicles, such as automobiles and the like.

One of the objects of the invention is to provide a plurality of seat units of improved construction, arranged to be detachably connected with a vehicle body.

Another object of the invention is to provide improved means for detachably securing a plurality of seat units upon a vehicle body in such a manner that the units will be rigidly held in a predetermined relationship upon the body.

Another object of the invention is to provide a new and improved seat base for a seat unit to which the upholstery for the unit may be quickly attached.

Another object of the invention is to construct a seat unit in such a manner as to protect the upholstery thereof against rubbing when the unit is in assembled position upon the structure provided for supporting the same.

Another object of the invention is to provide an improved seat unit base embodying integrally all of the elements for supporting and retaining the springs and upholstery of the unit.

Another object of the invention is to provide a simplified metal stamping, forming a seat unit base, constructed in such a manner as to admit of a quick and ready application of the upholstery to the base.

Still another object of the invention is to provide an improved and economical method of constructing seat units embodying comparatively few operations and obviating the necessity of employing skilled labor in the production of the units.

Further objects of the invention relate to economies of manufacture and details of construction, as will hereinafter appear from the description to follow.

The objects of the invention are accomplished in one instance by the devices and means described in the following specification, but it is evident that the same may be varied without departing from the scope of the invention as pointed out in the appended claims.

A structure constituting one embodiment of the invention which may be the preferred, is illustrated in the accompanying drawings forming a part of the specification in which:

Figure I is a plan view illustrating the manner of assembling the seat units upon an automobile body.

Figure II is a fragmentary sectional elevation illustrating in part the construction of the seat and seat back, together with the body structure for supporting the same.

Figure III is a bottom plan view of the improved metal base plate for the seat proper.

Figure IV is a fragmentary sectional elevation through the top portion of the seat back illustrating the manner of mounting the same upon the body structure.

Figure V is a rear view of the base plate for supporting the upholstery of the central seat back unit.

Figure VI is a front elevation of one of the end units for the seat back with a portion of the upholstery broken away to indicate the construction of the metal base plate forming a support for the upholstery.

Figure VII is a perspective view of a portion of the seat unit base plate indicating the manner of applying the marginal portions of the upholstery to the plate.

Figure VIII is a view in perspective of a portion of the base plate shown in Figure V looking from the rear at one corner of the plate.

Figure IX is a fragmentary view looking at one edge of the base plate shown in Figure V and indicating the curvature of the plate at the end thereof to conform to the curvature of the body structure at the end of the seat.

Figure X is a fragmentary sectional elevation illustrating a modified form of structure slightly different from that shown in Figures II and IV.

Figure XI is a bottom plan view of a portion of the seat base plate shown in section in Figure X.

Figure XII is a rear view of a portion of the base plate forming the back of the seat shown also in section in Figure X, and Figure XIII is a view in perspective of a portion of the seat back or base plate shown in Figure X, illustrating the manner of attaching the marginal portions of the upholstery to the base plate.

Like reference characters refer to similar parts throughout the several views of the drawings.

In the present invention, the upholstery for the seat units, in each case, is mounted upon and attached to a single metal stamping forming a base plate of substantially flat construction, the upholstery being coextensive with the plate or substantially so and covering one side thereof, with the marginal portions of the upholstery secured, in one embodiment of the invention, on the opposite side of the plate from that upon which the springs and upholstery are mounted, and in another, on the same side. In either case, the several seat units may be detachably secured upon the body structure in the same manner, as will be seen from the description to follow.

In the drawings, 10 indicates the body of an automobile having the usual front and back seats as indicated in Figure I, the upholstery units being omitted from the front seat, while for the rear seat the units are shown in assembled position comprising respectively the seat proper 11, the main seat back unit 12, and the side units 13 which abut the ends of the unit 12 and form a continuation of the same extending around to the side doors 14 of the body as shown in Figure I. A back plate 15 forming a part of the body structure is offset rearwardly at 16 and provided with an inturned and somewhat downwardly extending flange 17 as indicated in Figure IV. At the base of the offset portion 16 is formed a shoulder 18 upon which rests the upper ends of a plurality of reinforcing members 19 having ribs 20 resting upon the back plate 15 as indicated in Figure II. The lower ends of the members 19 are provided with inturned flanges 21 forming supports for the rear end of the seat frame member 22 which is also carried by the rearwardly extending flange 23 of the upright plate 24 forming a part of the body construction for supporting the seat. A plate 25 directly supporting the seat proper is mounted on top of the frame member 22 as indicated in Figure II. The seat frame structure at its front edge is provided with suitable means (not shown) for retaining the seat unit 11 upon the plate 25 and in contact with the seat back as indicated in Figure II.

While the inturned flange 17 of the back plate 15 is shown as being integral with the plate, it will be understood that said flange may constitute a separate member suitably connected with the plate as by spotwelding or otherwise and that the flange may be varied in shape according to the construction of the seat back unit at the point where the upper edge of the unit engages the flange.

The member for supporting the upholstery of the seat unit 11 comprises a substantially flat metal plate 26 the edges of which are inturned to form the flanges 27 extending on the side of the plate opposite to that having the groove 28 in which is disposed the beaded or marginal portion 29 of the depending apron 30 forming a part of the upholstery of the seat and connected at 31 with the inner and outer covering members 32 and 33 respectively, between which is placed a suitable quantity of cushioning material 34 as indicated in Figure II, it being understood that the members 32 and 33 together with the cushioning material 34 and apron 30 are preferably constructed as a single unit which may be quickly applied to and removed from the seat base separately from the remaining portions of the seat. A plurality of relatively small springs 35 are mounted in cloth or canvas bags 36, said bags all being enclosed in a casing 37 formed of cloth or other suitable material and having at its upper and lower edges, the beads 38 which serve to stiffen the casing and to hold the individual bags containing the springs in proper position within the casing. The casing is mounted directly upon the inner face of the base plate 26 and between the upper side of the casing and the inner covering 32 is mounted a layer of cushioning material 38' of any desired kind. The marginal portion 39 of the base plate in which the groove 28 is formed is offset inwardly from the main body of the plate or that portion lying within the outwardly pressed rib 40. The rib serves to space from the plate 25, the lower marginal portion of the apron 30, at the point where it extends over the inturned flange 27, thereby preventing the contacting of said portion with the plate and consequently preventing the rubbing of the same at this point.

Tongues 41 are struck outwardly from the offset portion 39 of the base plate and are bent back through an angle of 180° upon the marginal portion of the apron 30 to secure the same within the groove 28. This operation is performed without the use of a special tool, requiring only the use of a hammer or like tool for driving down the tongues into engagement with the bead or marginal portion of the apron 30.

Suitable bracing ribs 42 are stamped in the base plate 26 and extend preferably from the ends of the plate, adjacent the center thereof, to a point near the rectangular bracing rib 43 within which lies a circular bracing rib 44 as indicated in Figure III. It will be understood however that the bracing ribs just referred to may be disposed upon the base plate in any other desired manner serving to effectually brace the plate and prevent its buckling. A plurality of holes 45 are provided in the base which substantially lighten the same and which also serve to prevent the cushion from becoming "air-bound".

The base plate 46 for the seat back shown in Figure V is of the same general construction as the base plate for the seat proper shown in Figure III with the exception that the shape of the plate is somewhat different and that it is curved at its ends to conform to the contour of the back plate 15 of the body structure. The marginal portion of the base plate 46 for the seat back is offset inwardly as indicated at 47 with the edges of said marginal portion turned inwardly to form the flange 48. The marginal portion 47 of the plate is provided with a groove 49 on the opposite side of the plate from that on which the flange 48 is turned and tongues 50 are struck outwardly from the offset marginal portion 47 and bent back through an angle of substantially 180° upon the beaded or marginal portion 51 of the upholstery covering 52 to secure the upholstery upon the base plate. On the back of the covering 52 is a layer of suitable cushioning material 53 and over the same is placed a covering 54, all connected and forming a complete upholstery unit which is attached to the base plate 46 by carrying the marginal portion of the covering 52 over the turned edges or flanges 48 and disposing the beaded portion of the covering within the groove 49, after which the outstanding tongues 50 are bent down upon the bead as indicated in Figures II and IV. Mounted upon the inner face of the base plate 46 is a plurality of relatively small springs 55 each enclosed in a canvas or cloth bag 56, said bags being all enclosed in a casing 57 constructed of cloth or other suitable material, the casing having at its edges the beads 58 serving to stiffen the same so that it will better retain its shape and assist in holding the springs in proper position therein. Interposed between the casing 57 and the upholstery member 53 is a layer of cushioning material 58′ which is applied to the casing after the same has been inserted upon the base plate 46 and before the upholstery covering is attached to the base plate. At the top of the cushion above the casing 57 is mounted an additional layer of cushioning material 59 which serves as a filler between the top of the base plate and the cushion unit connected therewith. In order to provide means for properly centering and holding the spring casing 57 upon the base plate 46 while the upholstery is being applied thereto and for retaining the springs in the desired position upon the base plate I have provided a series of upper and lower inwardly extending tongues 60 and 61 respectively between which the spring casing is mounted as shown in Figures II and IV. These tongues serve to effectually hold the spring casing in the desired position and form means by which it may be quickly and accurately assembled upon the base plate during the construction of the seat unit. The base plate 46 is provided at the point where the offset portion 47 begins with an outwardly extending rib 62 adapted to rest upon the reinforcing members 19 carried by the back plate 15 as shown in Figures II and IV. The rib 62 extends entirely around the base plate and serves to space the marginal portions of the upholstery, at the point where they extend around the inturned edges or flanges of the base plate, away from the body structure, thereby preventing said marginal portions from rubbing upon the body structure at all points except where the upholstery covering comes in contact with the inturned flange 17 of the back plate 15, as shown in Figure IV. However, at this point there is very little movement imparted to the seat back units and the wear of the upholstery covering, occasioned by its contact with the flange 17 is negligible. The base plate 46 is provided with a plurality of outwardly struck ribs 63 extending longitudinally of the plate and also with a centrally disposed rectangular rib 64 lying within which is a centrally disposed rib 65 as shown in Figure XII. The ribs 63, 64 and 65 are all stamped outwardly preferably to the same depth as the rib 62 and said ribs rest upon the reinforcing members 19 secured on the back plate 15 of the automobile body as shown in Figure II. The ribbing of the base plate in the manner described serves to effectually brace the same and prevent its buckling when in service as well as when the upholstery is being applied thereto.

The central seat back unit 12 is held in position upon the body structure by a plurality of spring clips 67 resting upon the frame plate 22 and having rearwardly extending curved portions 68 adapted to engage the marginal portions of the covering 52 at the point where it extends around and in contact with the inturned edge or flange 48 of the base plate as shown in Figure II. The metal clips 67 are provided with downturned portions 68′ extending through openings provided in the frame plate 22 whereby said clips are held against accidental displacement. In applying the metal clips to the body structure, after the seat back has been assembled upon the structure, the clips are positioned in line with the holes in the plate 22, and then by the use of a suitable tool are driven into position until the downturned portions 68′ register with and are forced into the openings in the plate 22, and when driven to this position the clips firmly grip and hold the seat back unit more or less rigidly upon the body structure and serve to keep the upper edge of the unit in contact with the inner face of the downturned flange 17 carried by the back plate 15 at the upper edge thereof. If desired, the downturned portions 68′ of the clips may be first set in the openings in the plate 22 after which the clips, by the use of a suitable tool, are sprung into the position shown in Figure II. If it is desired to remove the seat back unit from the body structure, the portions 68 of the clips may be depressed, after which the bottom of the unit is pulled out, preferably by the use of a suitable tool provided for the purpose, or if desired, the bottom of the unit may be pulled out without first depressing said clip portions.

The base plate 46 is provided with a plurality of openings 66 serving to render the plate lighter in construction and also preventing the cushion from becoming "airbound" by admitting air between the plate and upholstery thereof.

The construction of the end units 13 is best shown in Figure VI. This unit comprises a base plate 69 stamped in a similar manner to the plate 46, a portion of the upholstery being removed to show the inner face of the plate at one corner thereof. A cross section through the upper edge or marginal portion of the plate, when in assembled position upon the body structure, would be the same as that shown in Figure IV, the upholstery being constructed and applied in the same manner as shown in said figure.

In the construction of each of the above described base plates the marginal flanges, grooves, ribs and offset portions, and in fact all raised or depressed portions are stamped in the plate by the use of suitable dies, with as few operations as possible, and when the stamping operations are completed a substantially flat plate is afforded, embodying integrally all of the elements necessary for supporting and retaining the springs and upholstery of the units. The springs may be quickly applied to the base plate since they are all assembled in a casing to form a unit which may be accurately positioned upon the base plate by reason of the inwardly extending tongues provided both for centering and holding the casing in the desired position. After this has been done, cushioning material, either loose or in the form of a pad is placed on the spring casing and certain portions of the plate not covered by the casing. The outer upholstery unit is then applied, with its marginal portion disposed within the groove on the back or bottom side of the plate. The outstanding tongues on the rear of the plate are then, by the use of a hammer or like tool, bent back upon the marginal portions of the upholstery and with this operation the construction of the unit is complete. In assembling the several units upon the body structure the two end units 13 for the seat back are first placed in position upon the back plate 15 and thereafter the central unit 12 is applied, beneath the lower edge of which is driven the spring clips for holding the upper edge of the unit against the bottom side of the inturned flange 17. The seat proper or unit 11 is then placed between the end units and forced into position against the lower edge of the back unit whereby the assembling operation is completed.

In the modification shown in Figures X to XIII inclusive, the body construction is the same as that shown in Figures II and IV and while the base plate for the seat back is shown as being constructed in a similar manner to the base plate for the seat proper, it will be understood that the form of seat back shown in Figure II may be substituted for that shown in Figure X if desired, as these constructions are readily interchangeable. In Figures X and XI, the base plate 70 for the seat proper is shown in section and in plan respectively. The marginal portion of the plate is provided with a downwardly struck rib 71 terminating at its outer edge in an upstanding portion 72. The concave portion of the rib forming a groove to receive the beaded or marginal portion 73 of a depending apron 74 carried by the seat cushion 75. The cushion is disposed upon the cushioning material 76 placed upon the spring casing 77 in which is grouped a plurality of relatively small springs 78 each disposed within a cloth or canvas bag 79. The spring casing is positioned directly upon the inner face of the base plate 70 as shown in Figure X and is held in the desired position by the upstanding tongues 78′ which are struck outwardly from the marginal portion 79′ of the plate. The plate 70 is preferably provided also with a downwardly struck stiffening rib 80 spaced inwardly from the rib 71 at any suitable distance, in the present instance at a point beneath the outer row of springs as shown in Figure X. Extending from the rib 80 at its central end portions are a plurality of longitudinally extending bracing or stiffening ribs 81, the inner ends of which terminate adjacent the rectangular bracing rib 82 within which lies the inner and outer circular rings 83 and 84 respectively. Openings 84′ are provided in the plate for the purpose of lightening the same. All of the above described ribs serve to stiffen and brace the plate to prevent its buckling and all are preferably of the same depth and rest upon the plate 25 of the seat structure which is supported by the frame plate 22 carried by the flanged portion 23 of the upstanding plate 24 and also by the inturned portion 21 of the reinforcing plate 19 on the seat back plate 15. The method of securing the beaded portion 73 of the apron 74 within the groove formed by the rib 71 comprises the striking inwardly of a plurality of tongues 85 of any desired width and number sufficient to firmly grip and hold the marginal portion of the apron within said groove. These tongues are bent back upon the beaded portion of the apron by means of a suitable tool provided for the purpose which is inserted through the openings 86 in the base plate to force said tongues down upon the apron. By means of the tongues the marginal portion of the apron is firmly held within the groove and is protected against rubbing on all sides of the unit by being kept out of contact with the metal portions of the body structure. The base plate 87 for the seat back unit is constructed in the same manner as the plate 70 with the exception that the contour of the plate is of course made to conform to the contour of the seat back plate 15 as will be understood. The base plate 87 is provided with the inner and outer ribs 88 and 89 respectively, the latter having the groove in which is disposed the beaded portion 90 of the upholstery covering 91 as shown in Figure X. The rib 89 carries the inturned upstanding edge portion 92 against the inner face of which the marginal portion of the upholstery covering is disposed and held by the inwardly struck tongues 93 which are bent down upon the upholstery in a similar manner and by the use of a tool similar to that employed for depressing the tongues 85 on the base plate 70. Cushioning material 94 is placed between the upholstery unit 91 and the spring casing 95, said casing being centered and held upon the plate by means of the inwardly struck tongues 96, the casing containing the springs 97, disposed within the individual cloth or canvas bags 98 as shown in Figure X. The base plate 87 is provided with the inwardly converging bracing ribs 98 extending from the end rib 88 to a point adjacent the rectangular rib 99 within which lies the inner and outer circular ribs 100 and 101 respectively as shown in Figure XII. The base plate is also provided with holes 102 whereby its construction is considerably lightened. Both the base plates 70 and 87 are stamped out by means of suitable dies and when completed each forms a unitary structure embodying integrally all of the elements necessary to support the springs and upholstery of the seat and seat back respectively. The base plates for the end units of the seat back, in the modification, have not been shown as they are similar in construction to the plate 87, differing only in size and conforming to the contour of the curved ends of the seat back plate 15 of the body structure.

As stated before, the base plate 46 for the seat back unit and the upholstery thereon as shown in Figure II may be used with the seat base 70 and upholstery thereon as shown in Figure X, as the two forms of construction are interchangeable.

In the modification shown in Figure X, the seat back unit is held in proper position upon the body structure by means of the spring clips 103 which are constructed and applied similarly to those shown in Figure II and described above. It will be understood however that if preferred, the clips may be omitted, as the bottom edge of the seat back unit may rest directly upon the frame plate 22, in which case the height of the unit will be slightly increased so that it will be substantially equal to the distance between the inturned flange 17 and the frame plate 22, or if desired, it may be slightly greater than the distance between these two points in order that the unit may be forced between these members to snugly engage the same.

While I have shown and described in considerable detail springs of a particular type for the several seat units it will be understood that other types of springs, of any desired kind, may be employed between the upholstery and base plates of the units.

In assembling the units 12 and 13 upon the body, it may be preferable to first place the end units 13 in position, before inserting the back unit 12, but this, however, is not considered necessary, as the unit 12 may be first placed in position and thereafter the end units 13 assembled in their respective positions at the ends of the back unit 12.

While I have shown and described my invention in more or less detail and as being embodied in certain precise forms, I do not desire or intend it to be limited thereto, as on the contrary, my invention contemplates broadly all proper changes, as well as the omission of immaterial elements and the substitution of equivalents as circumstances may suggest or necessity render expedient.

What I claim as new and desire to secure by Letters Patent, is:

1. In a seat structure, the combination of a sheet metal plate having a groove formed adjacent the edge thereof, said edge being turned to extend upon the side of the plate opposite that having the groove, upholstery upon the side of the plate on which the edge is turned, the marginal portions of the upholstery being carried over said turned edge and disposed within the groove, and means securing the upholstery within the groove.

2. In a seat structure, the combination of a sheet metal plate having a groove formed adjacent the edge thereof, said edge being turned upon the side of the plate opposite that having the groove, springs mounted upon the plate on the side opposite the groove, upholstery extending over the springs and forming a covering for the side of the plate upon which the springs are mounted, the marginal portions of the upholstery being carried over said turned edge and disposed within the groove, and means securing the upholstery within the groove.

3. In a seat structure, the combination of a single sheet metal plate forming a seat base and having a groove adjacent the edge thereof, springs mounted upon the plate on the side opposite the groove, upholstery extending over the springs and forming a covering for the side of the plate opposite the groove, the marginal portions of the upholstery being disposed within said groove, and means for retaining the upholstery within the groove.

4. In a seat structure, the combination of a substantially flat metal plate forming a seat base and having a groove adjacent the edge thereof, springs mounted upon the plate on the side opposite the groove, upholstery extending over the springs and forming a covering for the side of the plate upon which the springs are mounted, the marginal portions of the upholstery being carried around the edge of the plate and disposed within the groove, and tongues struck outwardly from the plate and bent into engagement with the marginal portions of the upholstery.

5. In a seat structure, the combination of a substantially flat metal plate forming a seat base and having a groove adjacent its edges, said edges being turned to provide smooth surfaces, upholstery forming a covering for the side of the plate opposite said groove, the marginal portions of the upholstery being carried over said turned edges and disposed within said groove, and integral members upon the plate serving to retain the upholstery within the groove.

6. In a seat structure, the combination of a substantially flat metal plate forming the seat base, springs mounted upon said plate, upholstery forming a covering for the springs and the side of the plate upon which the springs are mounted, the marginal portions of the upholstery being disposed on the side of the plate opposite the springs, and means for retaining said marginal portions upon the plate.

7. In a seat structure, the combination of a substantially flat metal plate forming the seat base, springs mounted upon said plate, upholstery forming a covering for the springs and the side of the plate upon which the springs are mounted, the marginal portions of the upholstery being disposed on the side of the plate opposite the springs, and tongues struck outwardly from the plate between the marginal portions of the upholstery and bent back upon said portions.

8. In a seat structure, the combination of a substantially flat metal plate forming the seat base, said plate having a groove adjacent the edges thereof, upholstery forming a covering for the side of the plate opposite the side having the groove, the marginal portions of the upholstery being disposed within said groove, and tongues struck outwardly from the plate between the marginal portions of the upholstery and bent back upon said portions.

9. In a seat structure, the combination of a substantially flat metal plate forming the seat base, springs mounted upon said plate, upholstery mounted upon the springs and forming a covering for the side of the plate upon which the springs are mounted, the marginal portions of the upholstery being disposed on the side of the plate opposite the springs, means securing said marginal portions upon the plate, and outwardly pressed portions upon the plate extending beyond the line of said marginal portions of the upholstery.

10. In a seat structure, the combination of a substantially flat metal plate, upholstery forming a covering for one side of the plate and having its marginal portions disposed on the opposite side of the plate, means integral with the plate for securing said marginal portions thereon, and portions integral with the plate extending outwardly in a plane spaced from and parallel with said marginal portions.

11. In a seat structure, the combination of a substantially flat metal plate comprising a seat back or base, springs mounted upon said plate, upholstery mounted upon the springs and forming a covering for the side of the plate upon which the springs are mounted and having its marginal portions disposed upon the opposite side of the plate, tongues struck outwardly from the plate and bent back upon said marginal portions, and outwardly pressed ribs upon the plate adjacent the tongues serving to stiffen the plate and to hold said marginal portions of the upholstery in spaced relation to a surface upon which said ribs are adapted to rest.

12. In combination, a substantially flat metal plate offset adjacent its edge, upholstery forming a covering for the side of the plate on which the offset is made and having its marginal portion extending over the edge of the plate and disposed upon said offset portion, and means serving to retain the marginal portion of the upholstery upon said offset portion.

13. In combination, a substantially flat metal plate offset adjacent its edge, the edge being turned at an angle to the offset portion, a groove formed in the offset portion on the side opposite the turned edge, upholstery forming a covering for the side of the plate opposite the groove and having its marginal portion extending over said turned edge and into said groove, and tongues struck outwardly from the plate and bent back to retain the upholstery within the groove.

14. In combination, a substantially flat metal plate offset adjacent its edge, a groove formed in said offset portion, upholstery forming a covering for the side of the plate opposite the groove and having its marginal portion extending over the edge of the plate and disposed within the groove, and means serving to retain the upholstery within the groove, said plate having a projecting portion adjacent said offset portion on the side of the plate having the groove and serving to hold said marginal portion of the upholstery in spaced relation to a supporting surface.

15. In combination, a substantially flat metal plate offset adjacent its edge, said edge being turned at an angle to the offset portion, a groove formed in said offset portion on the side opposite the turned edge, upholstery forming a covering for the side of the plate opposite the groove and having its marginal portion extending over said turned edge and into said groove, tongues struck outwardly from said offset portion and bent back upon the marginal portion of the upholstery, and a rib adjacent said offset portion on the side of the plate having the groove and serving to hold said marginal portion of the upholstery in spaced relation to a surface upon which the rib is adapted to rest.

16. A seat base comprising a substantially flat metal plate provided with a groove adjacent its edges arranged to receive the marginal portions of upholstery adapted to form a covering for the opposite side of the plate from that having the groove, and outwardly struck tongues on the side of the plate having the groove, said tongues being arranged to be bent back to engage the marginal portions of the upholstery when said portions are positioned within the groove.

17. A seat base comprising a substantially flat metal plate having a groove on one side adjacent its edges and adapted to receive on the opposite side the springs and upholstery of a seat unit, said edges being turned to extend upon the side of the plate opposite that having the groove, said groove being adapted to receive the marginal portions of the upholstery, and tongues struck outwardly from the plate in position to be bent down upon said marginal portions of the upholstery.

18. A seat base comprising a substantially flat metal plate adapted to receive the springs and upholstery of a seat unit, the plate being provided with a groove adjacent its edges to receive the marginal portions of the upholstery, tongues struck outwardly from the plate in position to be bent down over said marginal portions when placed in said groove, and outwardly pressed bosses on the side of the plate having the groove serving to space said marginal portions from a surface upon which the bosses are adapted to rest.

19. A seat base comprising a substantially flat metal plate offset adjacent its edges and adapted to receive on the offset side the springs and upholstery of a seat unit, a groove formed in said offset portion to receive the marginal portions of the upholstery, and tongues struck outwardly from the plate in position to be bent down upon said marginal portions of the upholstery.

20. A seat base comprising a substantially flat metal plate having its marginal portions offset with a groove therein, the extreme edges of said marginal portions being turned upon the side of the plate on which the offset is made, and tongues struck outwardly from said offset portion adjacent said groove in position to be bent down over the groove.

21. A seat base comprising a substantially flat metal plate having a groove formed in one side thereof adjacent the edge of the plate, the side opposite the groove being adapted to receive a covering of upholstery, the groove being adapted to receive the marginal portions of the upholstery, and a plurality of tongues struck out on the side having the groove and within the boundary of the groove, said tongues being arranged to be bent down upon the marginal portion of the upholstery.

22. In combination, a body structure, and a detachable seat unit upon said body structure comprising a substantially horizontal metal base plate and upholstery thereon extending over the edge of said plate, said plate being provided with an integral boss to engage said body structure to space said upholstery therefrom.

23. In an article of the class described, the combination of a substantially flat metal plate forming a base, a cushion structure mounted upon said plate, upholstery forming a covering for the cushion and the side of the plate upon which the cushion is mounted, the marginal portions of the upholstery being disposed on the side of the plate opposite the cushion structure and means for retaining said marginal portions upon the plate, said plate having integral outwardly extending ribs formed therein for spacing said marginal portions from a supporting surface.

In testimony whereof, I affix my signature.

HENRY A. WAGNER.